(12) United States Patent
Lu et al.

(10) Patent No.: US 10,364,320 B2
(45) Date of Patent: Jul. 30, 2019

(54) BIODEGRADABLE POLYESTER COMPOSITION

(71) Applicant: Hongmei Yang, Guangdong (CN)

(72) Inventors: Changli Lu, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Renxu Yuan, Guangdong (CN); Yuke Zhong, Guangdong (CN); Kai Xiong, Guangdong (CN); Hui Yang, Guangdong (CN); Kaijin Mai, Guangdong (CN); Xueteng Dong, Guangdong (CN)

(73) Assignee: Hongmei Yang, Guangdong (CN)

(*) Notice: Subject to any disclaimer, the term of this patent is extended or adjusted under 35 U.S.C. 154(b) by 0 days.

(21) Appl. No.: 15/578,249

(22) PCT Filed: Dec. 15, 2016

(86) PCT No.: PCT/CN2016/110000
§ 371 (c)(1),
(2) Date: Nov. 30, 2017

(87) PCT Pub. No.: WO2017/152678
PCT Pub. Date: Sep. 14, 2017

(65) Prior Publication Data
US 2018/0142060 A1 May 24, 2018

(30) Foreign Application Priority Data
Mar. 7, 2016 (CN) .......................... 2016 1 0126865

(51) Int. Cl.
| | | |
|---|---|---|
| *C08G 63/02* | (2006.01) | |
| *C08G 63/183* | (2006.01) | |
| *C08K 3/26* | (2006.01) | |
| *C08K 3/34* | (2006.01) | |
| *C08K 5/07* | (2006.01) | |
| *C08K 5/11* | (2006.01) | |
| *C08K 5/20* | (2006.01) | |
| *C08K 13/02* | (2006.01) | |
| *C08L 3/02* | (2006.01) | |
| *C08L 67/02* | (2006.01) | |
| *C08L 67/04* | (2006.01) | |
| *C08G 63/06* | (2006.01) | |
| *C08K 3/04* | (2006.01) | |
| *C08L 3/04* | (2006.01) | |
| *C08L 63/00* | (2006.01) | |

(52) U.S. Cl.
CPC .......... *C08G 63/183* (2013.01); *C08G 63/06* (2013.01); *C08K 3/04* (2013.01); *C08K 3/26* (2013.01); *C08K 3/34* (2013.01); *C08K 5/07* (2013.01); *C08K 5/11* (2013.01); *C08K 5/20* (2013.01); *C08K 13/02* (2013.01); *C08L 3/02* (2013.01); *C08L 3/04* (2013.01); *C08L 67/02* (2013.01); *C08L 67/04* (2013.01); *C08L 63/00* (2013.01); *C08L 2201/06* (2013.01); *C08L 2205/02* (2013.01); *C08L 2205/03* (2013.01)

(58) Field of Classification Search
USPC .......................... 525/165; 528/190, 193, 194
See application file for complete search history.

(56) References Cited

U.S. PATENT DOCUMENTS

| | | | | |
|---|---|---|---|---|
| 2011/0237750 A1* | 9/2011 | Ren | ....... | C08G 63/183 525/173 |
| 2012/0288650 A1* | 11/2012 | Freese | ....... | C08K 3/26 428/35.5 |
| 2013/0029124 A1* | 1/2013 | Loos | ....... | C08L 67/02 428/220 |
| 2018/0163044 A1* | 6/2018 | Lu | ....... | C08K 5/07 |

FOREIGN PATENT DOCUMENTS

| | | | | |
|---|---|---|---|---|
| CN | 1726257 | | 1/2006 | |
| CN | 101104702 | | 1/2008 | |
| CN | 101161701 | | 4/2008 | |
| CN | 101622311 | | 1/2010 | |
| CN | 102070880 | | 5/2011 | |
| CN | 102492271 | * | 6/2012 | ......... B29C 47/0011 |
| CN | 102639594 | | 8/2012 | |
| CN | 102863654 | * | 1/2013 | ............ B29C 47/92 |
| CN | 105585826 | | 5/2016 | |
| CN | 105585827 | * | 5/2016 | ............ B29C 47/92 |
| CN | 105713356 | | 6/2016 | |
| WO | 2006026111 | | 3/2006 | |

OTHER PUBLICATIONS

"International Search Report (Form PCT/ISA/210)", dated Mar. 20, 2017, with English translation thereof, pp. 1-6.

* cited by examiner

*Primary Examiner* — Terressa Boykin
(74) *Attorney, Agent, or Firm* — JCIPRNET

(57) ABSTRACT

A biodegradable polyester composition based on a total weight of the biodegradable polyester composition, including a weight content of cyclopentanone which is 0.5 ppm-85 ppm is provided. The cyclopentanone is added into the composition and controlling the content of cyclopentanone in the composition within a range of 0.5 ppm-85 ppm to realize a lubrication degree of a film of biodegradable polyester during a blow molding process. When a velocity of film blowing is 176 Kg/h, a range of a film thickness is less than 0.2 μm and a relative deviation of the film thickness is less than 1%.

22 Claims, No Drawings

BIODEGRADABLE POLYESTER COMPOSITION

CROSS-REFERENCE TO RELATED APPLICATION

This application is a 371 of international application of PCT application serial no. PCT/CN2016/110000, filed on Dec. 15, 2016, which claims the priority benefit of China application no. 201610126865.1, filed on Mar. 7, 2016. The entirety of each of the abovementioned patent applications is hereby incorporated by reference herein and made a part of this specification.

TECHNICAL FIELD

The present invention belongs to a field of modification of macromolecule materials, and specifically relates to a biodegradable polyester composition with excellent bubble stability.

BACKGROUND

Biodegradable polyester is a kind of macromolecule material using biological resources as raw materials. With respect to a petroleum-based polymer using petrochemical resources as raw materials, the biodegradable polyester can be degraded during a process of biological or biochemical effect or in a biological environment, being a very active degradable material in the present biodegradable plastic research and one of the best degradable materials in market application.

At present, biodegradable polyester film takes one of the most important application fields of biodegradable polyester, mainly including grocery bag, garbage bag, shopping bag, mulching film and the like. During blow molding process of the biodegradable polyester in preparing films, it frequently appears that the film is not lubricating enough to adhere to a roll or is too lubricating to roll up. Thus it results in poor bubble stability and large range of film thickness during film blowing which severely affect a continuity of film blowing. In CN 101622311A, by adding 0.05-5 wt % of biodiesel into a biodegradable polyester mixture, a viscosity of the polyester mixture is decreased, to some extent leading to less adherence of film to the roll, which guarantees the continuity of film blowing. However, a decrease of the viscosity of the polyester mixture indicates that an addition of biodiesel damages performances of the polyester to some extent, resulting in an increased melting index and a decreased viscosity of the polyester mixture.

The present invention surprisingly finds by research that adding a trace amount of cyclopentanone into the biodegradable polyester composition enables the biodegradable polyester to have obviously improved film blowing properties. When a velocity of film blowing is relatively high, it presents good bubble stability as well as relatively small range of film thickness and guarantees the continuity of film blowing production.

SUMMARY OF THE INVENTION

An object of the present invention is to provide a biodegradable polyester composition. By adding a trace amount of cyclopentanone into the composition, the prepared biodegradable polyester composition has excellent bubble stability.

The present invention is realized by following technical solution:

a biodegradable polyester composition includes following components in parts by weight:
i) 60 to 99 parts of biodegradable aliphatic-aromatic polyester;
ii) 0 to 40 parts of polylactic acid;
iii) 0 to 30 parts of an organic filler and/or an inorganic filler;
iv) 0 to 1 part of a copolymer which contains epoxy group and is based on styrene, acrylate and/or methacrylate.

In particular, based on a total weight of the biodegradable polyester composition, a weight content of cyclopentanone is 0.5 ppm-85 ppm, preferably 5 ppm-50 ppm, more preferably 10 ppm-35 ppm.

Preferably, the biodegradable polyester composition includes following components in parts by weight:
i) 65 to 95 parts of the biodegradable aliphatic-aromatic polyester;
ii) 5 to 35 parts of the polylactic acid;
iii) 5 to 25 parts of the organic filler and/or the inorganic filler;
iv) 0.02 to 0.5 part of the copolymer which contains epoxy group and is based on styrene, acrylate and/or methacrylate.

The weight content of cyclopentanone in the present invention is measured by following method: 1.2000 g of the biodegradable polyester composition is weighed accurately and added into a static headspace test flask; a peak area of cyclopentanone in the biodegradable polyester composition is measured by the static headspace method; the content of cyclopentanone in the biodegradable polyester composition is calculated according to the peak area of cyclopentanone in the biodegradable polyester composition and a standard curve of cyclopentanone; and the standard curve is calibrated by a solution of cyclopentanone/methanol.

The biodegradable aliphatic-aromatic polyester is one or more of poly (butyleneadipate-co-terephthalate) (PBAT), poly (butylenesuccinate-co-terephthalate) (PBST) or poly (butylenesebacate-co-terephthalate) (PBSeT).

Cyclopentanone which is added into the biodegradable polyester plays a lubricant-like part. However, if the content of cyclopentanone in the biodegradable polyester composition is too high, during a film blowing process at high velocity, a film is too lubricating to roll up well on a roll, and also it would results in an unstable film bubble. In research, the present invention found that by controlling the content of cyclopentanone in the biodegradable polyester composition as 0.5 ppm-85 ppm, a lubrication degree of the film during the blow molding process of the biodegradable polyester can be improved. When the velocity of film blowing is 176 Kg/h, a range of a film thickness is less than 0.2 μm and a relative deviation of the film thickness is less than 1%. The bubble stability and continuity of film blowing are guaranteed.

Based on the total weight of the biodegradable polyester composition, the weight content of cyclopentanone is preferably 5 ppm-50 ppm, more preferably 10 ppm-35 ppm.

The organic filler is selected from a group consisting of natural starch, plasticized starch, modified starch, natural fiber and wood flour, or a mixture thereof.

The inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

A route of acquiring cyclopentanone in the present invention is by means of adding cyclopentanone directly during blending, extruding and processing the biodegradable polyester composition.

According to different needs of use, the biodegradable polyester composition in the present invention can be further added with 0 to 4 parts of at least one of following substances: plasticizer, release agent, surfactant, wax, antistatic agent, pigment, UV absorbent, UV stabilizer and other plastic additives.

The plasticizer is one of or a mixture of two or more of tributyl citrate, glycerol, epoxidized soybean oil and the like.

The release agent is one of or a mixture of two or more of silicone oil, paraffin, white mineral oil and Vaseline.

The surfactant is one of or a mixture of two or more of polysorbate, palmitate and laurate.

The wax is one of or a mixture of two or more of erucamide, stearamide, behenamide, beeswax and beeswax ester.

The antistatic agent is a permanent antistatic agent, specifically listed as one of or a mixture of two or more of PELESTAT-230, PELESTAT-6500 and SUNNICO ASA-2500.

The pigment is one of or a mixture of two or more of carbon black, black masterbatch, titanium dioxide, zinc sulfide, phthalocyanine blue and fluorescent orange.

The UV adsorbent is one or more of UV-944, UV-234, UV-531 and UV-326.

The UV stabilizer is one or more of UV-123, UV-3896 and UV-328.

The other plastic additives can be nucleating agent, antifogging agent and the like.

The biodegradable polyester composition in the present invention can be used for preparing shopping bag, compost bag, mulching film, protective cover film, silo film, film strip, fabric, non-fabric, textile, fishing net, bearing bag, garbage bag and the like.

Compared to the prior art, the present invention has following beneficial effects:

In the present invention, by adding cyclopentanone into the composition and controlling the content of cyclopentanone in the composition in a range of 0.5 ppm-85 ppm, a lubrication degree of a film during a blow molding process of the biodegradable polyester can be improved. When the velocity of film blowing is 176 Kg/h, a range of a film thickness is less than 0.2 μm and a relative deviation of the film thickness is less than 1%. The bubble stability and the continuity of film blowing are guaranteed.

DETAILED DESCRIPTION OF THE PREFERRED EMBODIMENT

The present invention will be further described below by way of specific implementations, and the following embodiments are preferred implementations of the present invention, but the implementations of the present invention are not limited by the following embodiments.

In the embodiments of the present invention, PBAT is chosen as a component i), ADR4370 is chosen as a component iv), starch is chosen as an organic filler, talcum powder and calcium carbonate are chosen as inorganic filler, tributyl citrate is chosen as a plasticizer, palmitate is chosen as a surfactant, and erucamide is chosen as a wax. The above-mentioned promoters, PBAT, ADR4370, PLA and cyclopentanone are commercially available.

Embodiments 1-16 and Comparative Embodiments 1-4

According to formulas shown in Table 1, PBAT, PLA, ADR4370, organic fillers, inorganic fillers, promoters such as plasticizer, surfactant, wax and the like, and cyclopentanone were mixed evenly and put into a single screw extruder. After being extruded at 140° C.–240° C. and prilled, the compositions were obtained. Data of performance tests is shown in Table 1.

Performance Evaluation Method:

(1) Evaluation Method for Bubble Stability of a Biodegradable Polyester Composition:

The bubble stability of the biodegradable polyester composition during film blowing was evaluated by a method of a range of a film thickness and a relative deviation of the film thickness:

The film thickness was measured via a screw micrometer: 10 measurement points were taken evenly on a film of 1 m*1 m to measure the film thickness.

The range of the film thickness was a difference value between a maximum thickness and a minimum thickness among the 10 measurement points.

The relative deviation of the film thickness was calculated according to the following formula:

$$\text{relative deviation of film thickness \%} = \frac{\text{range of film thickness}}{\text{average film thickness}} \times 100\%$$

wherein, the average film thickness was calculated as an arithmetic average of the thicknesses measured respectively at the 10 measurement points which were taken evenly on the film of 1 m*1 m.

(2) Determination Method for Cyclopentanone:

1) Drawing of a Standard Curve of Cyclopentanone:

Cyclopentanone/methanol solutions in concentrations of 0.0001 g/L, 0.001 g/L, 0.01 g/L, 0.1 g/L, 5.0 g/L, 10.0 g/L and 20.0 g/L were prepared, respectively. Peak areas of cyclopentanone in the cyclopentanone/methanol solutions in different concentrations were measured respectively by a static headspace method. The standard curve of cyclopentanone was drawn, with the peak area of cyclopentanone as an ordinate and the concentration of cyclopentanone as an abscissa.

2) Measurement of a Content of Cyclopentanone in the Biodegradable Polyester Composition:

Approximate 1.2000 g of biodegradable polyester composition was weighed accurately and put into a static headspace test flask; the peak area of cyclopentanone in the biodegradable polyester composition was measured by the static headspace method; the content of cyclopentanone in the biodegradable polyester composition was calculated according to the peak area of cyclopentanone in the biodegradable polyester composition and the standard curve of cyclopentanone.

Instrument models and parameters for static headspace are as follows:

Agilent Technologies 7697 Headspace Sampler;
Agilent Technologies 7890A GC System;
Chromatographic column: J&W 122-7032: 250° C.: 30 m×250 μm×0.25 μm
Sample injection: front SS injection port N2
Sample production: front detector FID.

Conditions for static headspace test are as follows:

Temperature:
Heater: 105° C.
Quantitative loop: 135° C.
Transmission line: 165° C.

Time:
Balance for sample bottle: 120 minutes
Duration for sample injection: 0.09 minute
GC circulation: 30 minutes.

TABLE 1

Test data of Comparative Embodiments 1-4 and Embodiments 1-16 (parts by weight)

| | Comparative Embodiment 1 | Comparative Embodiment 2 | Comparative Embodiment 3 | Comparative Embodiment 4 | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|---|---|
| PBAT | 84.1 | 84.1 | 84.1 | 84.1 | 99 | 84.1 | 84.1 | 84.1 | 84.1 | 84.1 | 67 | 67.5 |
| PLA | 10 | 10 | 10 | 10 | | 10 | 10 | 10 | 10 | 10 | 15 | 32 |
| starch | | | | | | | | | | | 17 | |
| talcum powder | 1.6 | 1.6 | 1.6 | 1.6 | | 1.6 | 1.6 | 1.6 | 1.6 | 1.6 | | |
| calcium carbonate | 3.5 | 3.5 | 3.5 | 3.5 | | 3.5 | 3.5 | 3.5 | 3.5 | 3.5 | | |
| ADR4370 | 0.3 | 0.3 | 0.3 | 0.3 | | 0.3 | 0.3 | 0.3 | 0.3 | 0.3 | 0.5 | 0.3 |
| tributyl citrate | | | | | 0.5 | | | | | | | 0.1 |
| palmitate | | | | | | | | | | | 0.5 | |
| erucamide | 0.5 | 0.5 | 0.5 | 0.5 | 0.5 | 0.5 | 0.5 | 0.5 | 0.5 | 0.5 | | 0.1 |
| content of cyclopentanone (based on the whole composition)/ppm | 0 | 117 | 10 | 38 | 10 | 10 | 12 | 17 | 23 | 28 | 30 | 35 |
| extrusion velocity at film blowing/Kg/h | 176 | 176 | 125 | 200 | 176 | 176 | 176 | 176 | 176 | 176 | 176 | 176 |
| range of film thickness/μm | 0.31 | 0.42 | 0.21 | 0.29 | 0.19 | 0.10 | 0.10 | 0.14 | 0.15 | 0.12 | 0.13 | 0.15 |
| relative deviation of film thickness/% | 1.5 | 2.1 | 1.12 | 1.93 | 0.92 | 0.42 | 0.43 | 0.55 | 0.61 | 0.59 | 0.62 | 0.69 |

| | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|
| PBAT | 84.1 | 84.1 | 84.1 | 84.1 | 84.1 | 84.1 | 84.1 | 84.1 |
| PLA | 10 | 10 | 10 | 10 | 10 | 10 | 10 | 10 |
| starch | | | | | | | | |
| talcum powder | 1.6 | 1.6 | 1.6 | 1.6 | 1.6 | 1.6 | 1.6 | 1.6 |
| calcium carbonate | 3.5 | 3.5 | 3.5 | 3.5 | 3.5 | 3.5 | 3.5 | 3.5 |
| ADR4370 | 0.3 | 0.3 | 0.3 | 0.3 | 0.3 | 0.3 | 0.3 | 0.3 |
| erucamide | 0.5 | 0.5 | 0.5 | 0.5 | 0.5 | 0.5 | 0.5 | 0.5 |
| content of cyclopentanone/ppm | 6 | 8 | 38 | 50 | 1 | 4 | 62 | 85 |
| extrusion velocity at film blowing/Kg/h | 176 | 176 | 176 | 176 | 176 | 176 | 176 | 176 |
| range of film thickness/μm | 0.16 | 0.15 | 0.17 | 0.17 | 0.19 | 0.18 | 0.19 | 0.19 |
| relative deviation of film thickness/% | 0.81 | 0.74 | 0.83 | 0.84 | 0.98 | 0.89 | 0.90 | 0.95 |

It can be seen from Table 1 that the content of cyclopentanone in the biodegradable polyester composition is 0.5-85 ppm. When the velocity at film blowing is 176 Kg/h, the range of the film thickness is less than 0.2 μm and the relative deviation of the film thickness is less than 1%. It indicates that the composition has better bubble stability. In Comparative Embodiment 1, in which cyclopentanone has not been added and in Comparative Embodiment 2, in which the content of cyclopentanone is more than 85 ppm, the range of the film thickness is more than 0.2 μm and the relative deviation of the film thickness is more than 1%. It indicates that a film bubble of the composition is unstable. In Comparative Embodiment 3, in which the velocity at film blowing is lower than 176 Kg/h and in Comparative Embodiment 4, in which the velocity at film blowing is higher than 176 Kg/h, the range of the film thickness is more than 0.2 μm and the relative deviation of the film thickness is more than 1%. It indicates that the film bubble of the composition is unstable either.

What is claimed is:

1. A biodegradable polyester composition comprising following components in parts by weight:
   i) 60 to 99 parts of biodegradable aliphatic-aromatic polyester;
   ii) 0 to 40 parts of polylactic acid;
   iii) 0 to 30 parts of an organic filler and/or an inorganic filler;
   iv) 0 to 1 part of a copolymer which contains epoxy group and is based on styrene, acrylate and/or methacrylate,
   wherein based on a total weight of the biodegradable polyester composition, a weight content of cyclopentanone is 0.5 ppm-85 ppm.

2. The biodegradable polyester composition according to claim 1, wherein based on the total weight of the biodegradable polyester composition, the weight content of cyclopentanone is 5 ppm-50 ppm.

3. The biodegradable polyester composition according to claim 1, wherein the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler;
   iv) 0.02 to 0.5 part of the copolymer which contains epoxy group and is based on styrene, acrylate and/or methacrylate.

4. The biodegradable polyester composition according to claim 1, wherein the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve is calibrated by a solution of cyclopentanone/methanol.

5. The biodegradable polyester composition according to claim 1, wherein the biodegradable aliphatic-aromatic polyester is one or more of poly (butyleneadipate-co-terephthalate) (PBAT), poly (butylenesuccinate-co-terephthalate) (PBST) or poly (butylenesebacate-co-terephthalate) (PBSeT).

6. The biodegradable polyester composition according to claim 1, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

7. The biodegradable polyester composition according to claim 1, further comprising 0 to 4 parts of at least one of following substances: plasticizer, release agent, surfactant, wax, antistatic agent, pigment, UV absorbent, UV stabilizer and other plastic additives.

8. The biodegradable polyester composition according to claim 1, wherein when an extrusion velocity at film blowing of the biodegradable polyester composition is 176 Kg/h, a range of a film thickness is less than 0.2 μm and a relative deviation of the film thickness is less than 1%.

9. The biodegradable polyester composition according to claim 2, wherein the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler;
   iv) 0.02 to 0.5 part of the copolymer which contains epoxy group and is based on styrene, acrylate and/or methacrylate.

10. The biodegradable polyester composition according to claim 3, wherein the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve is calibrated by a solution of cyclopentanone/methanol.

11. The biodegradable polyester composition according to claim 9, wherein the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve is calibrated by a solution of cyclopentanone/methanol.

12. The biodegradable polyester composition according to claim 2, wherein the biodegradable aliphatic-aromatic polyester is one or more of poly (butyleneadipate-co-terephthalate) (PBAT), poly (butylenesuccinate-co-terephthalate) (PBST) or poly (butylenesebacate-co-terephthalate) (PBSeT).

13. The biodegradable polyester composition according to claim 3, wherein the biodegradable aliphatic-aromatic polyester is one or more of poly (butyleneadipate-co-terephthalate) (PBAT), poly (butylenesuccinate-co-terephthalate) (PBST) or poly (butylenesebacate-co-terephthalate) (PBSeT).

14. The biodegradable polyester composition according to claim 9, wherein the biodegradable aliphatic-aromatic polyester is one or more of poly (butyleneadipate-co-terephthalate) (PBAT), poly (butylenesuccinate-co-terephthalate) (PBST) or poly (butylenesebacate-co-terephthalate) (PBSeT).

15. The biodegradable polyester composition according to claim 2, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

16. The biodegradable polyester composition according to claim 3, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

17. The biodegradable polyester composition according to claim 9, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

18. The biodegradable polyester composition according to claim 2, further comprising 0 to 4 parts of at least one of following substances: plasticizer, release agent, surfactant, wax, antistatic agent, pigment, UV absorbent, UV stabilizer and other plastic additives.

19. The biodegradable polyester composition according to claim 3, further comprising 0 to 4 parts of at least one of following substances: plasticizer, release agent, surfactant, wax, antistatic agent, pigment, UV absorbent, UV stabilizer and other plastic additives.

20. The biodegradable polyester composition according to claim 9, further comprising 0 to 4 parts of at least one of following substances: plasticizer, release agent, surfactant, wax, antistatic agent, pigment, UV absorbent, UV stabilizer and other plastic additives.

21. The biodegradable polyester composition according to claim 4, wherein when an extrusion velocity at film blowing of the biodegradable polyester composition is 176 Kg/h, a range of a film thickness is less than 0.2 μm and a relative deviation of the film thickness is less than 1%.

22. The biodegradable polyester composition according to claim 1, wherein based on the total weight of the biodegradable polyester composition, the weight content of cyclopentanone is 10 ppm-35 ppm.

* * * * *